United States Patent [19]
Livet

[11] Patent Number: 4,655,249
[45] Date of Patent: Apr. 7, 1987

[54] ELECTROMAGNETIC VALVE

[75] Inventor: Jean Livet, Geneva, Switzerland

[73] Assignee: Honeywell Lucifer SA, Carouge, Switzerland

[21] Appl. No.: 849,923

[22] Filed: Apr. 9, 1986

[30] Foreign Application Priority Data
Apr. 11, 1985 [EP] European Pat. Off. ...... 85/810159.5

[51] Int. Cl.⁴ ...................... F15B 13/044; F16K 31/06
[52] U.S. Cl. ............................ 137/625.5; 137/625.65; 251/129.02; 251/129.18; 251/129.21
[58] Field of Search ........................ 137/625.5, 625.65; 251/129.02, 129.05, 129.07, 129.15, 129.18, 129.21

[56] References Cited
U.S. PATENT DOCUMENTS
3,285,285 11/1966 Bielefeld .......................... 137/625.65
3,588,039 6/1971 Chelminski et al. ........... 251/129.15
4,531,708 7/1985 Livet .......................... 251/129.15 X Primary Examiner—Gerald A. Michalsky
Attorney, Agent, or Firm—Mitchell J. Halista; Trevor B. Joike

[57] ABSTRACT

An electromagnetic valve uses a solenoid coil to produce a magnetic attraction of a cylindrical shell core against the action of a spring. A valve seat is constituted by a plate of a hard material arranged to cooperate with a circular ridge on an end of the core to obtain an hermetic seal therebetween. The plate is maintained against a bearing surface within a valve housing by a telescoping element located within the shell core and providing a sliding support surface for the shell core.

6 Claims, 2 Drawing Figures

F I G. 1
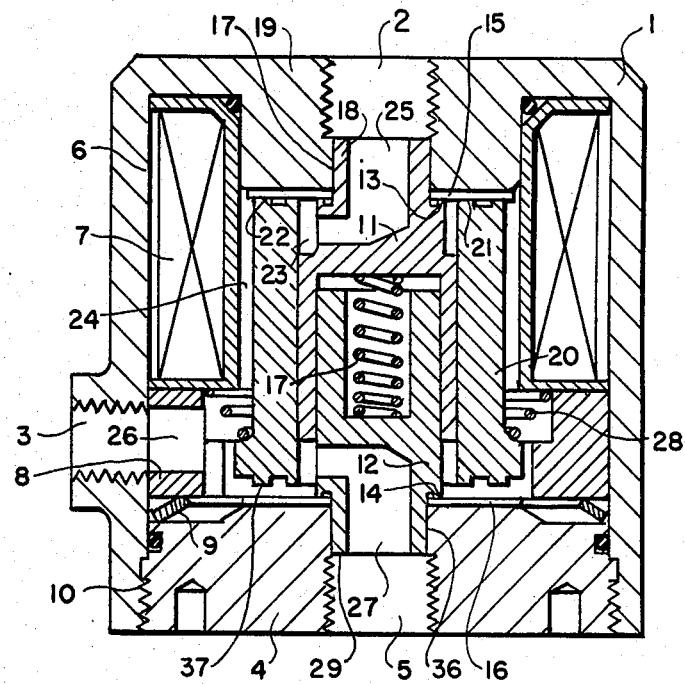
F I G. 2
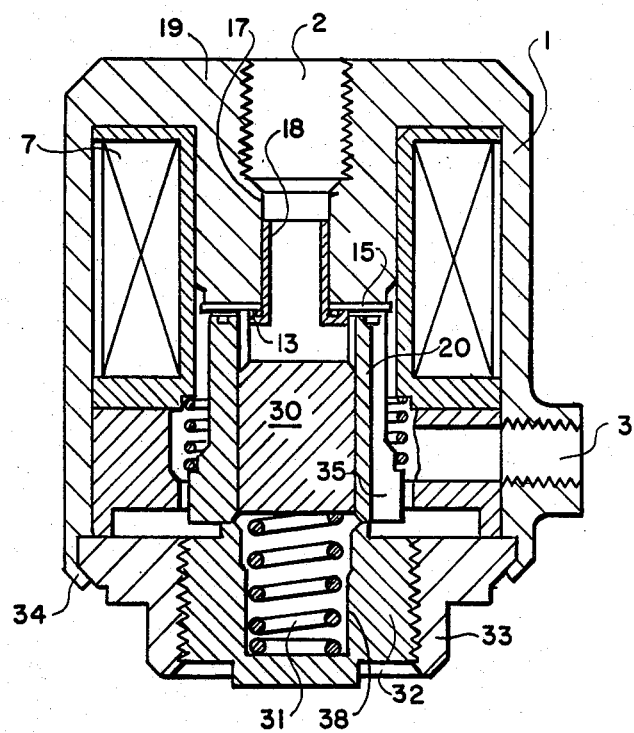

ELECTROMAGNETIC VALVE

BACKGROUND OF THE INVENTION

1. Field of the Invention

The present invention relates to valves. More specifically, the present invention is directed to a solenoid valve.

2. Description of the Prior Art

Pulsed electromagnetic valves are well-known and usually comprise a body delimiting a chamber in which a movable core forming a valve plug can be displaced under the action of a magnetic field produced by an electrical coil. The plug cooperates with at least one valve seat to control a fluid passage between the chamber and a connecting orifice. Valves of this type are generally utilized to obtain flow control by sending electrical pulses to open and close the valve, with the relative time of opening and closing and/or the frequency of opening and closing being chosen to obtain the desired flow through the fluid passage. To attain precision of regulation of the fluid flow, it is indispensible for the course of the valve plug to be defined with a precision on the order of several microns. Moreover, the accuracy of this course must not vary during a very great number of valve cycles, e.g., on the order of $10^9$ to $10^{10}$. To permit operation of the valve at elevated frequencies of opening and closing, it is also necessary for a magnetic remanence effect within the valve to be very small so as not to retard the return of the magnetic core controlling the valve plug. The present invention has as its goal to improve the precision and reliability of valves of the type described, by means of elements which are simple to manufacture and easy to install, while respecting the exigencies outlined above.

SUMMARY OF THE INVENTION

An object of the present invention is to provide an improved solenoid valve.

In accomplishing these and other objects, there has been provided, in accordance with the present invention, a solenoid valve having a body delimiting a chamber, an orifice in said body a movable magnetic core forming a valve plug that can be displaced under the action of a magnetic field produced by an electrical coil, an electrical coil, at least one valve seat cooperating with said core to control the passage of a fluid between the said chamber and said orifice, said seat being constituted by a non-magnetic washer with hardness at least equal to that of its support, a support for said washer, and spring means for axially urging said washer against said support, said spring means including a spring and a flanged element subject to said spring, and having a tubular end which is engaged in said body.

BRIEF DESCRIPTION OF THE DRAWINGS

A better understanding of the present invention may be had when the following description is read in connection with the accompanying drawings, in which:

FIG. 1 is a cross-sectional illustration of a solenoid valve embodying a first example of the present invention and FIG. 2 is a cross-sectional illustration of a solenoid valve embodying a second example of the present invention.

DESCRIPTION OF THE PREFERRED EMBODIMENT

Referring to FIG. 1 in more detail there is shown a first example of the present invention in a three-way valve embodiment. The valve comprises a valve body 1 of ferromagnetic material and including two fluid connecting orifices 2 and 3. The body 1 is closed at its lower portion by a threaded plug 4 having a third fluid connection orifice 5. The body 1 contains an internal recess 6 in which is disposed an electrical coil 7. The coil 7 is urged upward by an annular ferromagnetic sleeve 8 which is subject to the action of a spring 9, e.g., a conical washer. The spring 9 also bears against the plug 4, whose axial position can be regulated by a selective positioning along the screw thread 10. Two cylindrical elements 11 and 12 are arranged to telescope one within the other. A first element 11 has a first peripheral flange 13 while a second element 12 has a flange 14. The flanges 13 and 14 are arranged to bear against respective ones of a pair of plates 15 and 16 under the action of a spring 17 lodged within the elements 11 and 12 and arranged to urge the second element 12 out of the first element 11. The plates 15 and 16 are each constituted by a washer of non-magnetic material having a hardness at least equal to that of the body 1 against which they are held by the flanges 13 and 14, respectively.

The first element 11 includes an upper tubular coaxial portion 18, of circular cross section, which is arranged to fit within a recess 17 extending into the connecting orifice 2. The recess 17 is provided within an end portion 19 of the body 1 which portion 19 provides a magnetic flux path for one magnetic pole of the valve. This magnetic pole has the role of attracting a hollow cylindrical magnetic core 20 which is arranged to be coaxial with the first element 11 and is mounted to slide freely upon the element 11.

In an energized state of the valve, the attracted or first position of the core 20 is represented in FIG. 1 wherein the core 20 bears in an hermetic fashion against the plate 15, and to enhance a fluid seal with the plate 15 the core is provided with a first coaxial end ridge 21 at a first end of the core 21. In the attracted position, the ridge 21 on the core 20 interrupts a fluid path between an annular chamber 23 disposed within of the core 20 and an exterior annular chamber 24 surrounding the core 20. The annular chamber 23 communicates with the connecting orifice 2 through an angled fluid passage 25 within the element 11, while the chamber 24 communicates with the connecting orifice 3 through a fluid passage 26 provided in the annular sleeve 8. When the core 20 is in the attracted position, the chamber 24 is placed in fluid communication with the connecting orifice 5 through an angled fluid passage 27 provided in the second element 12. This element 12 includes a tubular coaxial portion 27 engaged within a recess 36 extending to the connecting orifice 5.

In the absence of current in the coil 7, i.e., a non-energized state of the valve, the magnetic attraction is absent, and the core 20 is returned to a second position to bear against the plate 16 by a return spring 28, to interrupt the fluid communication between the connecting orifices 3 and 5. The hermeticity or fluid seal against the plate 16 is likewise obtained by a second coaxial end ridge 37 provided at a second end of the core 20.

It is to be noted that by virtue of the fact that the core 20 slides on and is guided by the element 11, it is possible to provide a substantial clearance between the outer periphery of the core 20 and the body of the coil 7. Accordingly, the transverse section of the annular chamber 24 is relatively large, which greatly diminishes the dynamic resistance of the fluid controlled by the valve with respect to the fluid opposing the displacement of the core 20. Moreover, the thickness of the plate 15 of non-magnetic material enables a precise determination of the air gap desired between the core 20 in attracted position and the pole portion 19. This air gap is effective to avoid adhesion of the core 20 against the portion 19 and to enable a rapid return of the core 20 under the action of the spring 28 to the second position in a non-energized state of the valve. The course of the core 20 between the two positions is determined by the plug screw 4 in the body 1. At the first end of the core 20, the ridge 21 is surrounded by a second coaxial circular ridge groove 22 intended to enhance a flux path of the magnetic flux from the coil 7. The assembly of the described valve is very simple, because all its elements are introduced through the orifice in the body 1 provided the plug 4, and are then held in their correct position by an emplacement of the plug 4.

FIG. 2 represents a variation of the present invention which preserves the same principles as described above and shown in FIG. 1 in the case of a two-way valve which is shown in its normally open position. In this variation, the closing of fluid communication between the two fluid orifices 2,3 is effected by the core 20 and the pole portion 19 which is equipped with the plate 15. The two telescoping elements 11 and 12 are replaced by a single cylindrical guide 30 having a tubular extension 18 engaged within a recess 17 connecting with the orifice 2. The guide 30 has a coaxial circular flange 13 arranged to direct the plate 15 against the pole portion 19. The guide 30 is pushed upward by a spring 31 disposed between the guide 30 and a socket 38 within a blind plug 32. The plug 32 is screwed into a closing plate 33 which is crimped to the body 1 across an end opening of the body 1 by a flange 34. The passage of fluid between the connection orifices 2 and 3 is facilitated by longitudinal grooves 35 provided along the exterior surface of the core 20.

Accordingly, it may be seen that there has been provided, in accordance with the present invention, an improved solenoid valve.

The embodiments of the present invention in which an exclusive property or privilege is claimed are defined as follows:

1. A solenoid valve comprising
a body delimiting a chamber,
an orifice in said body,
a movable magnetic core forming a valve plug that can be displaced under the action of a magnetic field produced by an electrical coil,
an electrical coil,
at least one valve seat cooperating with said core to control the passage of a fluid between the said chamber and said orifice, said seat being constituted by a non-magnetic washer with a hardness at least equal to that of its support,
a support for said washer, and
spring means for axially urging said washer against said support, said spring means including a spring and a flanged element subject to said spring, and having a tubular end which is engaged in said body.

2. A valve according to claim 1 wherein said flanged element is engaged in a fluid passage from said body to ensure fluid communication between said passage and an interior space of said movable core.

3. A valve according to claim 2 wherein said movable core is mounted to slide on the said flanged element to ensure a guidance of said core.

4. A valve according to claim 3 wherein said valve includes a second valve seat disposed to cooperate with said core to control a second fluid passage, said seat being constituted by a second non-magnetic washer with a hardness at least equal to that of its support, and said flanged element includes two elements which are telescoping to slide one within the other while containing said spring extending therebetween.

5. A valve according to claim 4 wherein each of said two elements has an end engaged in said body.

6. A valve according to claim 4 wherein a support of one of said first-mentioned and said second washers is constituted by a displaceable plug whose position can be regulated so as to adjust the distance between the two seats to the desired value.

* * * * *